May 1, 1923.

E. C. DONALDSON

ELECTRIC HEATER

Filed Nov. 22, 1920

1,453,832

Inventor

Elizabeth C. Donaldson.

By Charles E. Hueny

Attorneys

Patented May 1, 1923.

1,453,832

UNITED STATES PATENT OFFICE.

ELIZABETH C. DONALDSON, OF HIGHLAND PARK, MICHIGAN, ASSIGNOR TO CHARLES S. DAVIS, RAY P. JOHNSON, J. CARL O'HARA, JOHN F. McNAUGHTON, A. EARL BOYCE, AND HENRY C. GORDON, ALL OF MUNCIE, INDIANA.

ELECTRIC HEATER.

Application filed November 22, 1920. Serial No. 425,682.

*To all whom it may concern:*

Be it known that I, ELIZABETH C. DONALDSON, a citizen of the United States, residing at Highland Park, county of Wayne, State of Michigan, have invented a certain new and useful Improvement in Electric Heaters, and declare the following to be a full, clear, and exact description of the same, such as will enable others skilled in the art to which it pertains to make and use the same, reference being had to the accompanying drawings, which form a part of this specification.

This invention relates to electric heaters, and the object of the invention is to provide an electric heater which may be used similarly to a hot water bottle or other body heating appliance. A further object of the invention is to provide an electric heater of the character described in which the intensity of heat may be increased or decreased at the will of the operator. A still further object of the invention is to provide an electric heater arcuate in form to conform to the shape of the body wherever the heater is applied and in which the heating element consists of a pair of incandescent bulbs, a switch being provided whereby either one or both of the bulbs may be ignited to increase or decrease the supply of heat. An advantage of the invention is the cheapness at which this heater may be produced in comparison with other heaters of like nature. These objects and the several novel features of the invention in its preferred form are hereinafter more fully described and claimed and shown in the accompanying drawings in which—

Figure 1:
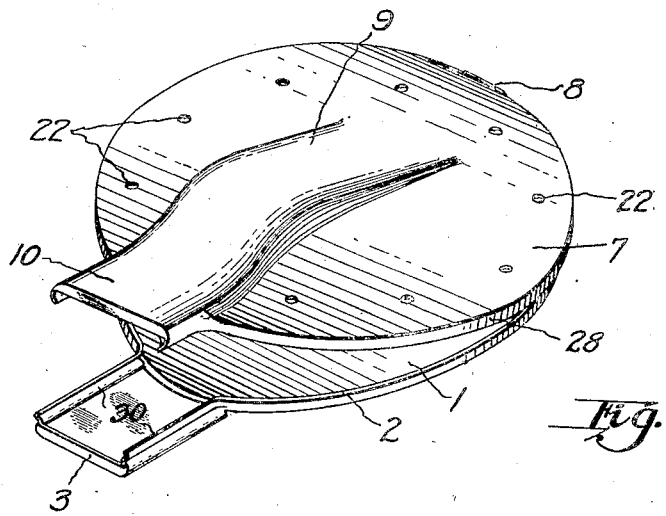
Fig. 1 is a perspective view of an electric heater embodying my invention, the heater being partly open to illustrate the construction thereof.
Figure 2:
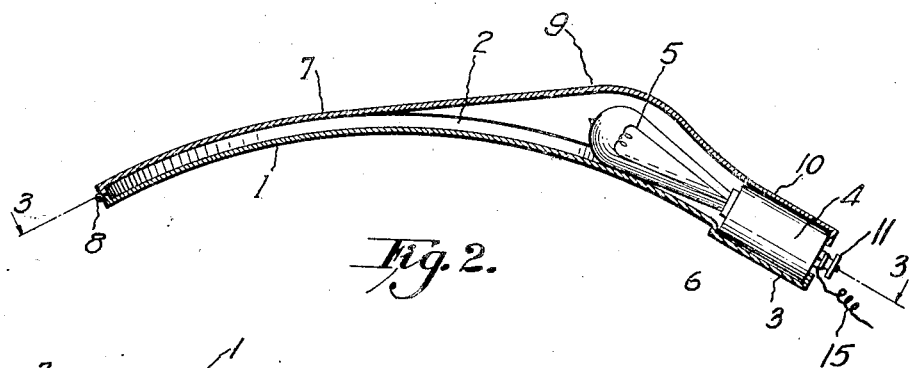
Fig. 2 is a section through the heater.
Figure 3:
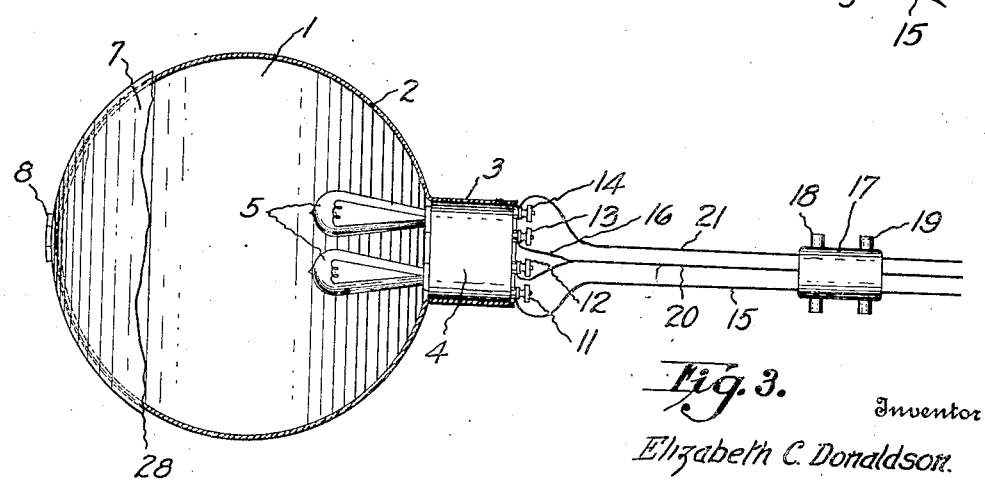
Fig. 3 is a plan view of the heater, the cover being partly broken away to show the position of the incandescent bulbs.

The heater is preferably formed of suitable material such as aluminum or the like which has the quality of retaining the heat. The lower part of the heater consists of a round body contacting plate which is preferably polished. This plate 1 is arcuate in cross section and provided with a flange 2 as shown more particularly in Figs. 1 and 2. The plate 1 is further provided with a protruding portion 3 which is curved to receive the double socket 4 in which the incandescent bulbs 5 are positioned. The portion 3 is provided with a pair of spring clips 30 adapted to engage and hold the double socket 4 in position and a cover 7 is provided for the device having a downwardly extending flange 28 adapted, when the device is closed, to engage over the outer surface of the flange 2 of the plate 1. This cover 7 is hinged to the member 1 at 8 and is also provided with an upwardly protruding hollow enlargement 9 which forms a housing for the incandescent bulbs 5. The cover 7 is also provided with a rounded protruding portion 10 somewhat similar to the portion 3 of the member 1 adapted to engage over the upper surface of the double socket 4 as shown in Fig. 2. This double socket 4, in which the incandescent bulbs 5 are mounted, is provided with a series of terminals 11, 12, 13 and 14, the terminals 11 and 12 being connected with the incandescent bulb 5 at the left of Fig. 3 and the terminals 13 and 14 being connected with the bulb at the right of Fig. 3. Connected with these terminals 11, 12 and 14 are the three respective supply lines 15, 20 and 21 and a branch line 16 is provided from the central line 20 which is connected with the terminal 13. The lines 15, 20 and 21 extend into a switch 17, extending through which are two buttons 18 and 19, actuation of the button 18 supplying electricity through the wires 15 and 20 to the bulb 5 at the left of Fig. 3 and actuation of the button 19 supplying electricity through the lines 20 and 21 to the bulb 5 at the right of Fig. 3. Thus, by actuation of both buttons 18 and 19 both the incandescent bulbs 5 are ignited and by operation of either of the buttons alone only one of the bulbs is ignited. By this construction the heat applied to the curved plate 1 may be increased or decreased according to the will of the operator. A series of star shaped openings 22 may be provided in the cover 7 of the heater which allow circulation of air therethrough but as the heater will operate without these openings, they may be omitted if desired.

In operation the device is generally used to relieve pain and for this purpose the plate 1 is positioned over the portion of the body or head in which the pain occurs and, by operation of either switch button 18 or 19, one of the lights 5 is ignited to heat the device. By this means the plate 1 is heated and will relieve in a manner similar to the relief obtained by the use of a hot water bottle. Should the heat from one of the incandescent bulbs be insufficient to entirely relieve the pain, by operation of the remaining switch button the remaining bulb 5 may be ignited thereby applying additional heat to the device and further tending to relieve the pain. This device has many features of superiority over the ordinary hot water bottle, there being no possibility of leakage occuring or of hot water being spilled on the operator at the same time the necessity of heating water for the hot water bottle and refilling the same with hot water when the water therein becomes cooled is done away with. A greater number of incandescent bulbs may be used than shown if desired to supply a greater amount of heat to the heater, it being necessary that a switch be supplied so that the lights may be turned on one at a time until the correct quantity of heat is provided. It is also to be noted that the plate 1 may be changed in shape if desired and it is considered to be within the limitations of this invention (which is an improvement on my Patent No. 1,035,555 dated Aug. 13, 1912) to curve the plate 1 in the opposite direction or to make in any desired shape to fit different portions of the body. This device may be manufactured at a comparatively low manufacturing cost and may be sold at a much lower figure than the usual electric heaters of this type, a particular feature of the invention residing in the use of incandescent bulbs as a heating element and the provision of a switch whereby the applied heat may be increased or decreased at the will of the operator. This heater may be also used in conjunction with a wet compress to keep it hot and another advantage of this device over the hot water bottle is that the intensity of heat remains constant whereas with the hot water bottle the hot water must be frequently replenished to maintain the desired temperature.

From the foregoing description it becomes evident that the device is very simple and efficient in operation, of low manufacturing cost and provides a device which cannot easily get out of order and which accomplishes the objects desired.

Having thus fully described my invention, its utility and mode of operation, what I claim and desire to secure by Letters Patent of the United States is—

1. In an electric heater, a body contacting member shaped to fit portions of the human body, a series of incandescent lamps releasably secured in the said body contacting member, a cover hinged to the said first named member fitting over the said lamps, electric circuits for the said lamps, and means for separately energizing the said circuits.

2. In an electric heater, a body contacting member circular in shape and arcuate in cross section, a series of incandescent electric lamps carried in the said body contacting member, a cover member for the body contacting member hinged thereto and provided with an upwardly extending protuberance forming a housing for the said lamps, an electric circuit for each lamp, and means for separately energizing the circuits.

3. In an electric heater, a body contacting member consisting of a flanged circular plate arcuate in cross section, a series of incandescent electric lamps supported in a single block, means for releasably securing the block to the said body contacting member, a flanged cover fitting over the body contacting member and hinged thereto, said cover being provided with a protuberance providing a housing for the said lamp, an electric circuit for each lamp, and means for separately energizing the circuits.

4. In an electric heater, a metal body contacting member circular in form and arcuate in cross section and provided with an upwardly extending flange about the periphery thereof, a series of incandescent electric lamps, a block in which the said lamps are supported, a protuberance on the said body contacting member provided with spring clips yieldably holding the said block therein, a cover for said body contacting member provided with a peripheral flange fitting thereover, an upwardly extending protuberance forming a housing for the said lamps, an outwardly extending protuberance adapted to engage over the said block when the device is closed, the cover being provided with a series of apertures for the circulation of air through the heater, an electric circuit for each lamp, and means for separately energizing the circuits.

In testimony whereof, I sign this specification.

ELIZABETH C. DONALDSON.